J. F. O'CONNOR.
HAND BRAKE.
APPLICATION FILED APR. 1, 1918.
1,300,474.
Patented Apr. 15, 1919.
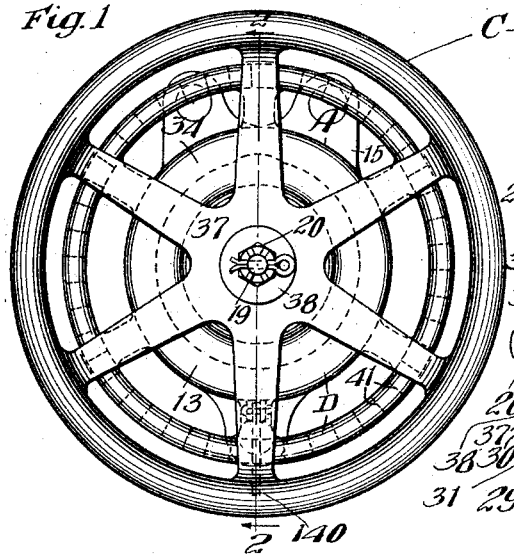
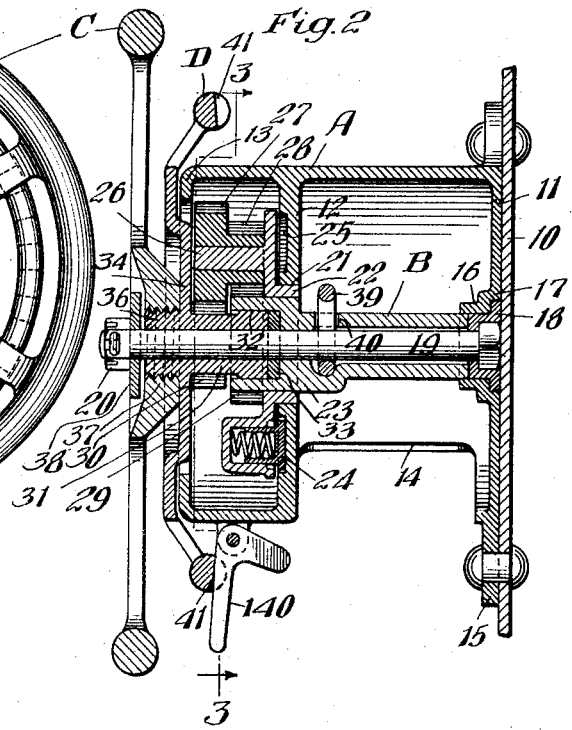
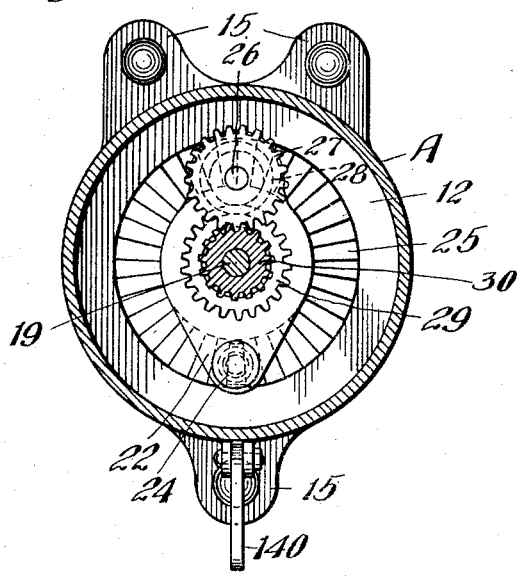
INVENTOR.
John F. O'Connor
BY George J. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

HAND-BRAKE.

1,300,474.         Specification of Letters Patent.     Patented Apr. 15, 1919.

Application filed April 1, 1918. Serial No. 225,889.

*To all whom it may concern:*

Be it known that I, JOHN F. O'CONNOR, a citizen of the United States, residing at Chicago, in the county of Cook and State of Illinois, have invented a certain new and useful Improvement in Hand-Brakes, of which the following is a full, clear, concise, and exact description, reference being had to the accompanying drawings, forming a part of this specification.

This invention relates to improvements in hand brakes.

The object of the invention is to provide a hand brake for railway cars and having a high speed, relatively small leverage ratio during the preliminary winding of the chain to take up slack and means for automatically changing to a relatively slower speed with higher leverage ratio to effect the final chain winding or tightening movement.

In the drawing forming a part of this specification, Figure 1 is a side elevational view of a hand brake showing my improvements in connection therewith. Fig. 2 is a vertical, sectional view, taken substantially on the line 2—2 of Fig. 1. And Fig. 3 is a vertical, sectional view, taken substantially on the line 3—3 of Fig. 2.

In said drawing, my improved hand brake is shown attached to the end wall 10 of a railway car. The hand brake itself, comprises, broadly, a housing casting A, a chain winding drum B, an operating hand wheel C, an auxiliary locking wheel D, and gearing and ratchet means hereinafter specifically described.

The housing or casing A is in the form of a casting of substantially cylindrical form having an inner wall 11, an intermediate wall or partition 12, and an outer inwardly extending flange 13. The casing is cut away at the bottom, as indicated at 14, to provide the necessary clearance for the chain which is wound about the drum B. At its inner end, the casing A is provided with suitable outstanding lugs or ears 15 by which the device is riveted to the wall 10.

The chain winding drum B is mounted at its inner end in a bearing 16 formed integrally with the inner wall 11, said bearing 16 being so designed as to provide a shoulder 17 for a bushing 18 having a socket to receive the head of a bolt 19 which extends through the drum B and other parts of the mechanism and has the retaining nut 20 applied thereto at its outer end. The intermediate partition 12 is suitably recessed, as indicated at 21, to form a bearing for a plate 22 which in turn has an interior bearing for the enlarged end 23 of the drum B so that the drum B may rotate with respect to the plate 22 and the drum and plate 22 may rotate in unison in the bearing provided by the intermediate partition 12.

The plate 22 carries at one side of its center a spring-controlled pawl 24 which is adapted to coöperate with a series of ratchet teeth 25 formed integrally on the outer side of the partition 12, as clearly appears in Figs. 2 and 3. At a diametrically opposed point, the plate 22 has a preferably integral stud 26 on which is rotatably mounted a double pinion having an outer large pinion 27 and an inner smaller diameter pinion 28. The inner pinion 28 meshes with a pinion 29 preferably formed integrally on the outer end of the drum B. The other pinion 27 meshes with a smaller pinion 30 preferably formed integrally on the hub 31 of the locking wheel D, said hub 31 being extended into a socket 32 formed in the outer end of the drum B. A washer 33 is interposed between the end of the hub 32 and the adjacent shoulder formed on the drum B, for the purpose hereinafter described.

The locking wheel D has a central disk section 34 of such diameter as to extend over the flange 13, part of said disk section being inwardly dished to a position flush with the flange 13, thereby forming a weather seal to prevent rain, dirt, etc., from getting within the casing A. Outside of the plate portion 34, the locking wheel D has formed thereon a threaded section 36 with which coöperates a correspondingly threaded hub 37 of the operating wheel C. A washer 38 is mounted on the bolt 19 between the nut 20 and hub 37 and there is normally a small space between said washer 38 and the hub 37, for the purpose hereinafter described. The upper link of the brake chain is shown at 39 and is preferably seated within a suitable opening 40 formed in the drum B and hooked over the bolt 19 so as to grip the latter and thereby cause the bolt and drum to rotate in unison during the winding action.

The normal position of the parts is as shown most clearly in Fig. 2, that is, with the hub 37 of the operating wheel slightly spaced from the washer 38. When it is desired to wind up the chain, the operator grasps the hand wheel C in one hand and the locking wheel D in the other hand and then rotates the one with respect to the other a comparatively small amount and until the hand wheel C travels outwardly on the threaded section 36 into tight frictional engagement with the washer 38. In this connection, it will be noted that the other end of the bolt 19 engages the sleeve 18 and consequently any desired endwise friction can be placed upon the engaging parts mounted on the bolt, that is, by rotating the two wheels relatively to each other so as to separate them axially, the hub 37 and plate 38 can be placed in engagement and the hub 32 of the locking wheel forced tightly against the washer 33 and the latter in turn tightly against the drum B. This action can, of course, be effected almost instantly and a friction clutch or grip is thereby obtained between the operating wheel C and the drum B. Thereupon, the operator, releasing his hold upon the locking wheel D, rotates the wheel C in a manner to wind the chain about the drum B, and as the hand wheel C is rotated, the drum B, plate 22, and the meshing pinions, together with the locking wheel D, will all rotate in unison and at a rotating speed similar to the rotating speed of the wheel C. In this connection it will be understood that the pawl 24 and ratchet 25 are so designed as to permit this rotative movement on the plate 22. This action will continue during the taking up of the slack portion of the chain and until such time as the tension on the chain is sufficient to overcome the friction between the wheel C and drum B. When this tension has been produced, continued rotation of the hand wheel C in a clockwise direction will be independent of the movement of the drum B, locking wheel D and meshing pinions. In other words, the wheel C will be rotated down on the threaded section 36 of the locking wheel D and disengaged from the washer 38, thereby also releasing the friction clutch device. In actual practice, this will be effected in a small fraction of a turn, preferably about one-eighth of a turn, which may be regulated by the pitch of the engaging threaded portions. As the wheel C is thus rotated and is screwed tight upon the locking wheel D, both wheels will again rotate in unison but the drum B will be held by the tightened chain. Consequently, as the two wheels C and D are rotated, the pinion 30 on the locking wheel will rotate the pinion 27 which in turn will cause the pinion 28 to rotate the pinion 29 on the drum B. In this manner, the speed of the rotation of the drum B is reduced, but the leverage ratio is obviously multiplied due to the interposed gearing and during the actuation of the pinions, tendency of the plate 22 to rotate in a reverse direction is prevented by the pawl 24 and ratchet 25. Release of the chain is prevented by the pivoted locking dog 140 which coöperates with the ratchet teeth 41 formed on the locking wheel D and to release the parts, it is merely necessary to disengage said dog 140 from the ratchet wheel 41 and the device made ready for another winding.

The device is compact, is easy to operate, and effects automatically the change from high speed, low power, to a relatively slow speed, high power winding action as the slack in the chain is taken up and the tension becomes greater.

I claim:

1. In a mechanism of the character described, the combination with an element adapted to be rotated to effect tightening of a chain; of a manually operable member; means providing a friction clutch between said member and element to effect rotation of the latter in unison with said member; and means interposed between said member and said element for multiplying the leverage ratio and adapted to be brought into action when the friction clutch means become ineffective, the friction clutch means becoming automatically ineffective when a predetermined degree of resistance is offered to the rotation of said element.

2. In a mechanism of the character described, the combination with a chain winding drum; of a hand wheel rotatable in one direction to effect winding movement of said drum; friction clutch acting means interposed between said wheel and drum, said wheel being rotated in a reverse direction for a slight preliminary action to bring the friction means into operation; and lever ratio multiplying gearing also interposed between said wheel and said drum, the wheel being adapted to effect rotation of said drum in unison therewith by the clutch means and to effect a slower rotation of the drum by said gearing.

3. In a mechanism of the character described, the combination with a rotatable chain winding drum; of a manually operable member; means for frictionally engaging said member and drum whereby movement of said member is imparted to said drum; and gearing interposed between said member and drum, said gearing moving in unison with the drum while the friction means are effective, said friction means being rendered inoperative upon a predetermined amount of tension being exerted against the rotation of the drum.

4. In a hand brake mechanism, the combination with a casing; of a chain winding drum rotatably mounted therein; a manually operable member; friction means interposed between said member and drum adapted to impart movements of said member to the drum; lever ratio multiplying gearing mounted within the casing and also interposed between said member and the drum, said gearing being operative when the friction means are rendered inoperative; and means for preventing accidental reverse rotation of said drum when the latter is rotated by either the friction means or the gearing.

5. In a mechanism of the character described, the combination with an element adapted to be rotated to effect tightening of a chain or the like; of a manually operable member; means providing a friction clutch between said member and said element to effect rotation of the latter, said means including a threaded spindle and a nut adjustable thereon to effect the frictional contact of the clutch elements; and means interposed between said manually operable member and said element for multiplying the leverage ratio, said last named means being operable only when the friction clutch means are rendered inoperative.

6. In a hand brake for railway cars and the like, the combination with a casing adapted to be secured to the car wall, of a chain winding drum rotatably mounted in said casing, a hand wheel, a sleeve alined with said drum, said hand wheel being adjustable lengthwise of said sleeve, the sleeve and drum being adapted to be forced into frictional clutch relation upon movement of said hand wheel with respect to the sleeve in one direction, and leverage ratio multiplying gearing interposed between said sleeve and said drum, said gearing being brought into play when the sleeve is released from frictional clutch engagement with the drum.

In witness that I claim the foregoing I have hereunto subscribed my name this 27th day of Mar., 1918.

JOHN F. O'CONNOR.

Copies of this patent may be obtained for five cents each, by addressing the "Commissioner of Patents, Washington, D. C."